3,104,216
IRRADIATION OF METAL OXIDES
Simon L. Ruskin, deceased, late of New York, N.Y., by Carol Farhi, Dan B. Ruskin, and Milton Reder, executors, all of New York, N.Y., assignors to Union Carbide Corporation, a corporation of New York
No Drawing. Filed Dec. 17, 1958, Ser. No. 780,917
2 Claims. (Cl. 204—157)

This invention relates to the irradiation of chemical compounds and reactions resulting therefrom. More particularly, this invention relates to the transformation of chemical compounds by irradiation whereby chemical reactions can be promoted which are ordinarily impossible.

This is a continuation-in-part of an earlier filed application, Serial No. 492,803, "Irradiation of Chemical Compounds and Resulting Reactions," filed March 7, 1955, now Patent No. 2,940,951.

It is an object of this invention to produce ceramic metallic compounds of unusual characteristics.

A still further object of the invention is the utilization in ceramic metallic compounds of clays, carbonates and hydrates which, when subjected to irradiation of 100 million to 400 million r., undergo heterogeneous equilibria at elevated temperatures which make them suitable for admixture in the metallic ceramic compounds and for ceramics of unique properties of strength, abrasion resistance, and electrical conductivity. The transformations of these clay minerals may be readily traced by differential thermal analysis or by single crystal studies. Thus, the irradiation at 100 million r. of $$CaO—Al_2O_3—SiO_2$$

mixtures followed by heating at 1600° C. and freezing at 1266° C. causes marked changes in electrical resistance and capacitance in such mixtures. When the temperature falls below 1200° C. to the solid state, the irradiated compound maintains the electrical resistance and capacitance close to that of the freezing level instead of the marked fall commonly observed.

A further property of the metallo-ceramic polymers of the invention is the capacity to act as semi-conductors of electricity. Whereas in the past only crystals of germanium or silicon could function as semi-conductors, it has been found that the plastic compositions of germanium-silicon polymer can serve as semiconductors in a capacity similar to crystals permitting conduction by excess electrons. If desired, fibres containing the metallo-ceramic may be prepared by adding a solution of the metallo-ceramic to a solution of viscose before spinning. Such fibers may be advantageously used in windings for insulations where semiconductor properties are desired.

To produce the invention one may irradiate an oxide or salt of the rare metals such as titanium, tantalum, tungsten, vanadium, zirconium, germanium, silicon, thallium, thorium, lanthanum, gallium, uranium, indium, selenium, beryllium, molybdenum, rubidium, cesium, or one may use oxides or salts of other metals and alkaline earth metals such as aluminum, cadmium, barium, calcium, manganese, superphosphate, nickel, chromium, copper, silver, platinum, palladium, or iron. In some instances one use the carbide of the metal or a combination of the oxide and the carbide of different metals. While one may use generally a single metal oxide, a combination of metal oxides in heterogeneous equilibrium may also be used.

The degree of radiation which is employed is usually from 100 million r. to 400 million r. However, in some instances one may employ dosimetry as low as 25 million r. It has been found that 100 million r. is the more desirable dosage and most generally useful. To achieve this radiation it has been found that the cobalt bomb is most efficacious.

The effect of this level of dosage is to randomize the crystals in such a manner that during sintering there is very little or no crystal growth, thus producing great density and freedom from pores.

After irradiation, the metallic oxides with which the invention is concerned are partially reduced to the free metal to a varying degree from .2% to as much as 5%. To promote this reduction one may suspend the metallic oxide in water or a medium that is readily oxidizable such as glycerol, sugar or other organic or mineral compound.

The irradiated metallic compound is then washed free of the suspending material with water and centrifuged at high speed preferably from 20,000 to 30,000 revolutions per minute. Higher speeds produce even greater and more desirable uniformity of texture after sintering. The irradiated and centrifuged material is now dried and pressed and pre-fired to a temperature of 1200° to 1300° C. and then subjected to a soaking period at 1650° for 7 to 10 hours followed by slow cooling over 12 hours. After sintering, the specimen is machined by diamond tools to its final shape and finish. It is sometimes advisable to remove the entire outer skin to eliminate any possible surface contamination or irregularities. In some instances the end product may be of a consistency that lends itself to gem formation when cut in facets that reflect light. Thus a titanium oxide treated by the process of the invention readily yields a clear translucent flux that may be cut like a diamond on appearance. Instead of effecting centrifugation before heating one may employ a high temperature centrifuge with which it is possible to secure a sample in the liquid phase in some inorganic systems at temperatures up to 1600° C. Where a clear translucent flux is desired, this is the preferred system.

Another system that one may irradiate to produce unique effects in electrical conductivity is $$Na_2O—FeO—SiO_2$$

which is irradiated to 100 million r. A gallia-alumina system may also be irradiated to produce similar effects.

In simple salt-water systems equilibrium may be reached within a period of a few hours to a few days. However, with the formation of complex double salts, a system may require several weeks of stirring at constant temperature to attain equilibrium. This occurs for instance in the system $Ba(ClO_3)_2—Ba(NO_3)_2·H_2O$. When one irradiates this system with 100 million r. equilibrium is established in 4 to 6 hours forming $$Ba(ClO_3)_2—Ba(NO_3)_2·12H_2O$$

The double salts are stable at 10° C. and 25° C. but not at 45° C.

By similar procedure, one may obtain a continuous solid solution in an aqueous ternary system with ammonium sulphate and the sulfate of cesium, potassium or rubidium; or one may use argentous and thallous salts to form solid solutions after irradiation to 100 million r.

One may also use as a solvent for the irradiated oxides the eutectic system cryolite-sodium fluoride. The solution of the irradiated oxides in the molten cryolite proceeds much more rapidly and compounds of increased density result.

A still further system which one may irradiate to 100 million r. is $K_2O—FeO—Al_2O_3—SiO_2·H_2O$, which yields the iron analogue of biotite. By the procedure of the invention, compositions found in nature and hitherto not reproducible became readily synthesized with properties possessed by the natural product. Similarly, one may use the system: $K_2O—MgO—Al_2O_3—SiO_2$ to produce products of great stability.

The silica systems containing ferrous oxide are particularly effective in forming heterogeneous equilibria after irradiation between 100 million r. and 400 million r. It is best conducted in the absence of air or the presence of nitrogen.

While diaspore ($Al_2O_3 \cdot H_2O$) forms in nature only at temperatures above 275° C. and at pressures exceeding 2000 p.s.i., it has been found that irradiation at 100 million r. of $Al_2O_3$ in water without elevation of temperature or pressure forms diaspore. A series of diaspore-gallium solid solutions may also be prepared. Similarly, a series of alumina-silica-water irradiations at 100 million r. forms crystalline phases yielding valuable metallic compounds. By like procedure one may form a ternary compound of $Al_2O_3$—$2SiO_2 \cdot H_2O$ or $MgO$—$Al_2O_3$—$SiO_2$ resembling sapphirine. When in proportions of $4MgO$ to $5Al_2O_3$ the resemblance to natural sapphirine is striking.

By the above reactions it is apparent that solid state reactions may be induced by irradiation from 100 million r. to 400 million r. Fluorosilicates of the mica and amphibole group as well as the system diopside ($CaO$—$MgO$—$2SiO_2$)-forsterite $$(2MgO-SiO_2)-(CaO-Al_2O_3-SiO_2)$$

or the quaternary system ($CaO$—$MgO$—$Al_2O_3$—$SiO_2$) may be formed. The latter represent the important silicate structures belonging to the group of pyroxenes, olivines and feldspars. It is evident that the formation of materials found in nature as the result of formations of great periods of time may be catalyzed to react at levels of radiation in the range of 100 to 400 million r. followed by temperatures ranging from 500° C. to 2000° C. and pressures up to 15000 p.s.i. The cooling period may be conducted in the presence of superheated steam to secure more uniform crystallization.

Similarly, a purified form of carbon is mixed with carbonyl iron and irradiated to 100 million r. It is now heated to solution and rapidly chilled to the solid state. The iron is then slowly liquefied under vacuum and the carbon crystals separated out.

In some instances one may irradiate to 100 million r. to 400 million r. metallic compounds whose dielectric properties change when a polymorphic transition occurs. These phase transitions are stabilized by the irradiation.

One may thus irradiate barium titanate or related ferroelectric substance to 100 million r. and subsequently heat to 120° C. at which temperature phase transitions occur. After cooling, the barium titanate is resistant to disordering mechanisms occurring in crystals due to temperature motion.

In preparing metal oxides or ceramics with metal oxides after irradiation with 100 million to 400 million r. the subsequent heating temperatures may be less than the melting point for reaction to occur. Thus while the melting point of titanium dioxide is 1840° C.±10° C. and reaction of titanium carbide and boron carbide to form a heterogeneous equilibrium usually occurs at 1920° C. to form $TiB_2$, it is possible by the procedure after irradiation in accordance with the invention to effect this reaction at much lower temperatures. Similarly, $$TiO_2-SiO_2$$

is easily formed.

By irradiating $Al_2O_3$ in the presence of $SiO_2$ and heating to the melting point, at low pressure, the oxide condenses in the form of crystals above the charge and does so at temperatures below the 1800° C. which is ordinarily required. The compound $Na_2B_2O_3SiO_2$ which is important in the glass industry forms readily after irradiation with 100 million r. as does the germanium compound $Na_2CaOGeO_2$ which shows high transparency to the infra red and opacity toward the ultra violet.

It is apparent from these many reactions that the invention has discovered a basic principle of the reaction of high dosage radiation in the region of 100 million to 400 million r. of solid state ceramic metallic compositions whereby a degree of predictability of reactions is possible. The basic effect of this high irradiation is the formation of random rearrangement of crystals. This randomness leads to quicker reactions of heterogeneous systems and increased density and strength.

A still further object of the invention is the formation of metallo-ceramic polymers, either long-chain or cross-linked. The long-chain metallo-ceramic polymers are useful for lubricants at high and low temperatures while the cross-linked polymers are converted to the solid state by heat or drying.

To form the metallo-ceramic polymers of the invention, one may irradiate with 100 million r. a mixture of a metallic oxide such as an oxide of the rare metals preferably, although other metal oxides may be employed, with silicic acid and an alcohol having two or more functional hydroxyl groups such as glycerine, ethylene glycol, mannitol and the like or one may use a combination of functional hydroxyl groupings such as chitin, chitose or amine soyan derivatives with glycerine or ethylene glycol, or one may combine the metallo-ceramic composition with other known plastic materials such as the urea formaldehyde, melanine formaldehyde, alkyl resins, vinyl resins, polystyrenes, acryloid plastics, polyethylene or organosilicon polymers, thus combining the unusual properties of the metallo-ceramic polymers with the synthetic plastics and resins already known.

A presumptive graphic formula of the metallo-ceramic polymer of the invention is as follows:

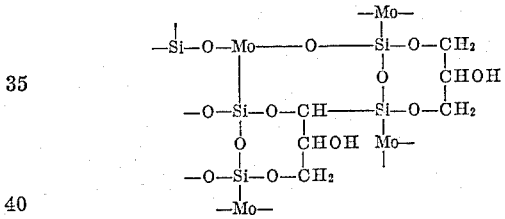

While other linkages may prevail, it is apparent that polymerization does occur. Instead of moylbdenum oxide, one may use germanium, tantalum, titanium, indium, tungsten, vanadium, boron, phosphorus, manganese, magnesium, arsenic, antimony, bismuth, cesium, thallium, rubidium, gallium oxides, or iron, copper, cobalt, nickel, chromium, silver, palladium, platinum, aluminum, strontium, calcium oxide, or in general, polyvalent metal oxides. Instead of silicic acid, one may use other acids and acid anhydrides containing two or more functional acid groups such as phthallic acid, malic, succinic acids and the like combined with silicon dioxide and another metallic oxide such as molybdenum oxide. In general, to make the metallo-ceramic polymer of the invention, one combines silicic acid with a metal oxide and a carbon compound containing two or more functional hydroxyl groups capable of reacting with the silicic acid and the metal oxide to form a polymer either of the long-chain type or convertible to the solid state by heat drying with or without compression.

A further property of the metallo-ceramic polymers is the capacity to act as semi-conductors of electricity. Whereas in the past only crystals of germanium or silicon could function as semi-conductors, it has been found that a plastic composition of germanium-silicon polymer can serve as semiconductors in a capacity similar to crystals permitting both conduction by excess electrons and conduction by holes. If desired, fibres containing the metallo-ceramic may be prepared by adding a solution of the metallo-ceramic to a solution of viscose before spinning. Such fibres may be advantageously used in windings for insulation where semiconductor properties are desired.

Thus it has been found that it is possible to use the metallic oxides in powder metallurgy in place of the metal itself. If the metallic oxide is irradiated to 100 million r. to 400 million r. in the presence of an oxygen acceptor which may be an organic compound and in some instances also in the presence of an oxidation reduction catalyst such as platinum oxide, palladium oxide or vanadium oxide. Thus also, a single metal oxide like titanium or a mixture of metal oxides with silicon oxide or silicic acid will yield, after customary powder metallurgy techniques commonly known to metallurgists, a metallo-ceramic composition possessing the unique properties formerly obtainable only with the pure metal. Thus instead of employing expensive titanium metal, one is able to use the commercially cheap, freely available titanium oxide to produce metallo-ceramic tool parts of great value.

*Example I*

300 grams of titanium oxide are stirred up with 300 cc. of glycerol and a small amount of platinum oxide added. The mixture was subjected to 100 million r. producing a white paste with supernatant fluid. This was centrifuged at 3000 r.p.m. and the supernatant fluid decanted. The powder was pressed dry and a slug made by the addition of 4% copper powder, 2% paraffin, 2% stearic acid. The whole was moulded into a cylindrical form and subjected to 25,000 pounds pressure. The cylinder was then heated to 2000° C. in a stream of hydrogen for 30 minutes and then allowed to cool gradually for 12 hours. During sintering, the whole mass fused and on cooling had a bluish-black color. The fused mass exhibited diamond hardness and readily scratched glass with even light pressure. The metallo-ceramic slug was tooled to a smooth surface with diamond tools. This metallo-ceramic part could be used readily for hardtool parts, gun muzzles or jet propulsion equipment. Similar reactions were made with titanium oxide, glycerol and palladium; titanium oxide, glycerol and water and vanadium pentoxide, and titanium oxide glacial acetic, water and vanadium pentoxide, all of which had been subjected to 100 million r. from a cobalt bomb.

*Example II*

300 grams of zirconium oxide were mixed with 300 grams of silicic acid, 200 cc. of glycerol and 100 cc. of water. The whole was subjected to 100 million r. After irradiation, a white solid precipitate could be separated from the supernatant fluid. This material could be readily formed into a slug of semi-conductor metallo-ceramic material.

*Example III*

300 grams of titanium oxide and 300 grams of silicic acid were mixed with 100 cc. of water and irradiated to 100 million r. A dirty white precipitate could be separated from a brownish supernatant fluid. This material could be readily formed into slugs of metallic-ceramic composition.

*Example IV*

300 grams of molybdenum sesquioxide and 300 grams of silicic acid were mixed with 300 cc. of water and irradiated to 100 million r. by a cobalt bomb. A dark green precipitate formed with a blackish supernatant fluid. The precipitate could readily be formed into a slug of extremely hard composition.

What is claimed is:
1. A process for the production of hydrous oxides which comprises irradiating a mixture of oxides in water with about 100 million roentgens at room temperature and pressure, said oxides consisting of a member selected from the group consisting of aluminum oxide; the mixture of aluminum oxide and silicon oxide; the mixture of magnesium oxide, aluminum oxide and silicon oxide; and the mixture of zirconium oxide and silicon oxide.

2. A process for producing a ceramic of high strength and abrasion resistance which comprises irradiating a mixture of oxides with about 100 million roentgens, thereafter heating the mixture to a temperature of about 1600° C., and subsequently cooling said mixture to a temperature of below about 1200° C., said mixture of oxides being a mixture selected from the group consisting of aluminum oxide and silicon oxide; sodium oxide, iron oxide, and silicon oxide; gallium oxide and aluminum oxide; potassium oxide, aluminum oxide, and silicon oxide; and potassium oxide, magnesium oxide, aluminum oxide, and silicon oxide.

References Cited in the file of this patent
UNITED STATES PATENTS

| | | |
|---|---|---|
| 2,770,922 | Fitzgerald | Nov. 20, 1956 |
| 2,910,372 | Ruskin | Oct. 27, 1959 |

FOREIGN PATENTS

| | | |
|---|---|---|
| 515,501 | Belgium | May 13, 1953 |

OTHER REFERENCES

Physical Review, vol. 75, No. 12 (June 15, 1949), page 1823.

Journal of American Chemical Society, vol. 76 (1954), pages 971–973.